B. W. LESH.
ROTARY CULTIVATOR.
APPLICATION FILED FEB. 17, 1919.

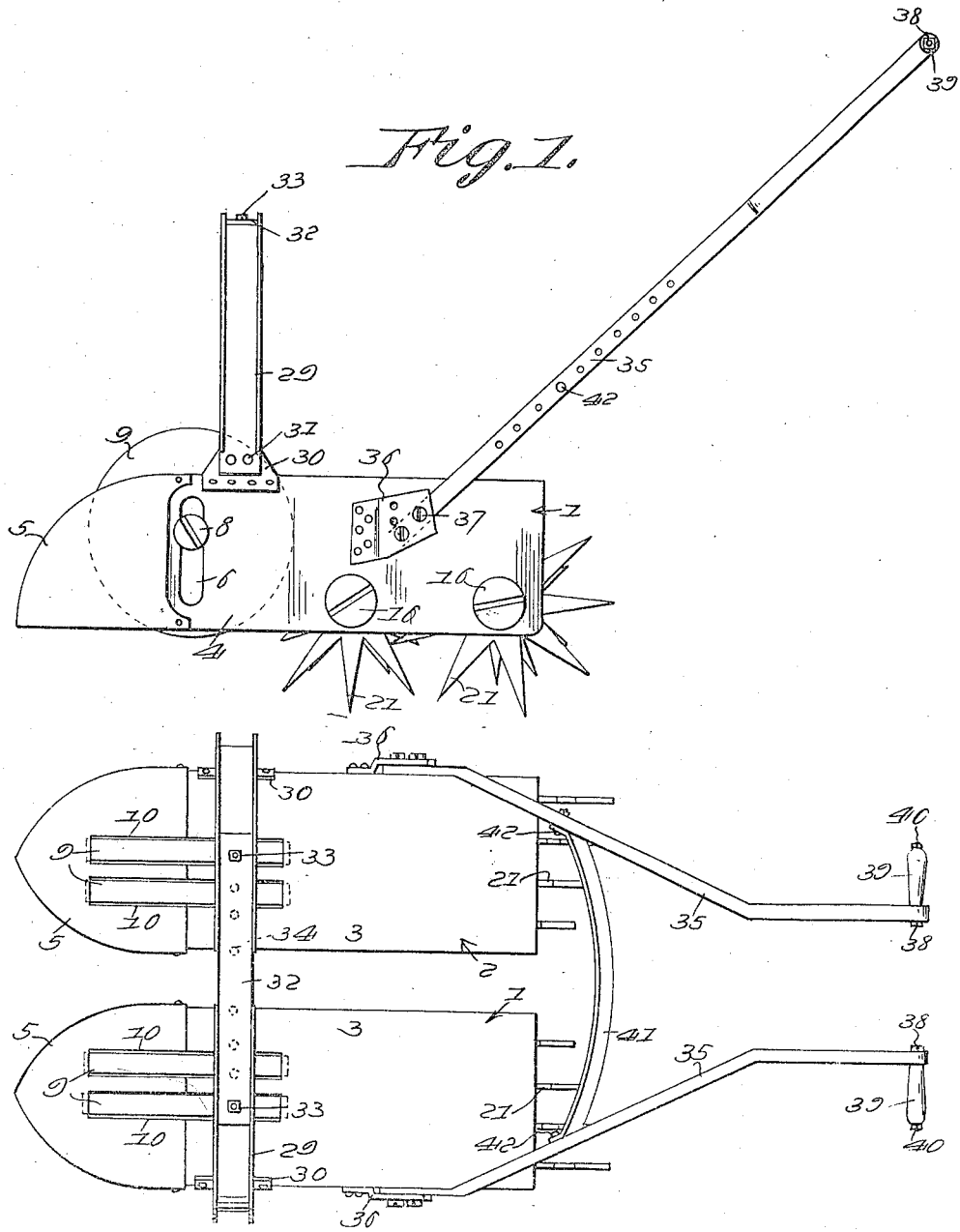

1,320,875.

Patented Nov. 4, 1919.
3 SHEETS—SHEET 2.

Inventor
Benjamin W. Lesh,
By
Attorney

B. W. LESH.
ROTARY CULTIVATOR.
APPLICATION FILED FEB. 17, 1919.
1,320,875.
Patented Nov. 4, 1919.
3 SHEETS—SHEET 3.
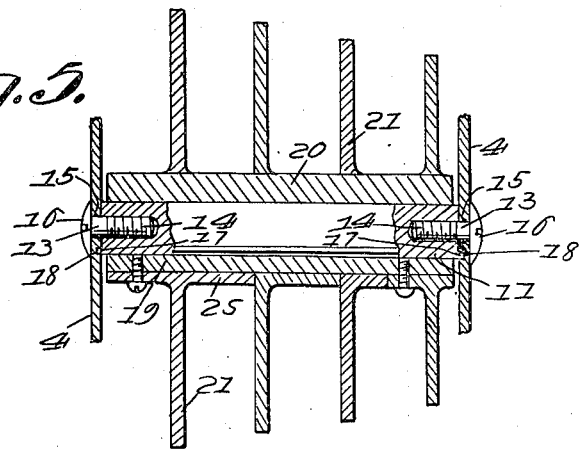
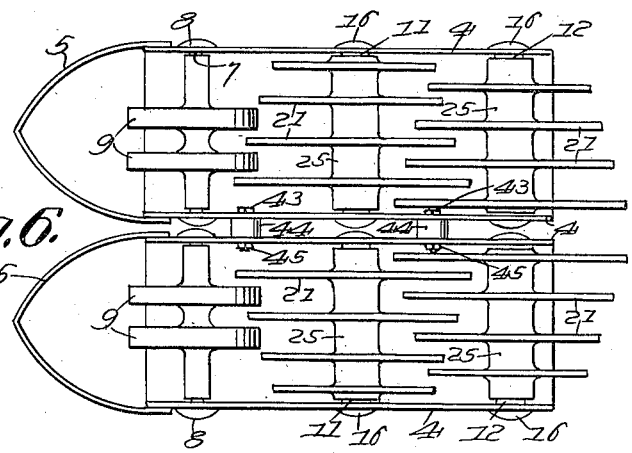
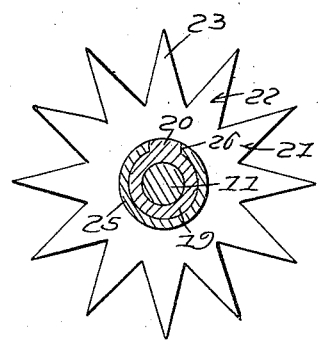
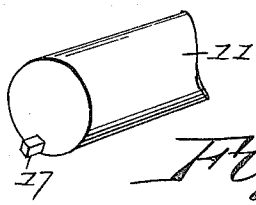
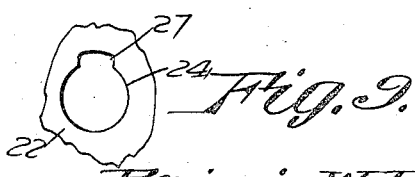

UNITED STATES PATENT OFFICE.

BENJAMIN W. LESH, OF CONNEAUT LAKE, PENNSYLVANIA.

ROTARY CULTIVATOR.

1,320,875.  Specification of Letters Patent.  Patented Nov. 4, 1919.

Application filed February 17, 1919. Serial No. 277,491.

*To all whom it may concern:*

Be it known that I, BENJAMIN W. LESH, a citizen of the United States of America, residing at Conneaut Lake, in the county of Crawford and State of Pennsylvania, have invented new and useful Improvements in Rotary Cultivators, of which the following is a specification.

This invention comprehends generally improvements in that class of inventions known as plows, and more particularly relates to a rotary cultivator.

The present invention has for its principal aim and object to provide a device of the above mentioned character designed in sections and so constructed that they may be connected to each other in such a manner as to straddle a row of plants and be positioned on opposite sides thereof, or else operate between and be arranged in close relation with adjacent rows of plants for treating the soil and for removing weeds, et cetera, therefrom.

More particularly the present invention contemplates the provision of a device of the above mentioned character wherein toothed disks are mounted in transverse rows in the housing of each section and are arranged out of alinement or alternately with respect to the toothed disks of the adjacent rows for acting on the soil as the device is being moved thereover, the peculiar construction and arrangement of the toothed disks assuring of the soil being lifted directly upwardly, while the disks clean each other as by removing sticks, trash, et cetera, from the teeth on the disks as the disks pass each other during rotation.

It is a more specific object of this invention to provide gage wheels and coöperative means for adjustably mounting the gage wheels in the housings of each section; to provide an adjustable arch or yoke for connecting the sections to each other and in parallel spaced relation; and to also construct the toothed disks of each row of various diameters for assuring of the proper treating of the soil when the device is in use; and to also provide improved means for mounting the disks so that the disks of each row will move or rotate with each other.

Among the other aims and objects of this invention may be recited the provision of a device of the character described with a view to compactness, and in which the number of parts are few, the construction simple and the cost of production low and the efficiency high.

Other improvements and novel details in the construction and arrangement of the various parts of the apparatus will be brought out more in detail in the description to follow, which for a clear understanding of the invention should be considered in connection with the accompanying drawings forming a part hereof, and wherein is disclosed for the purpose of illustration a convenient and satisfactory embodiment of the invention. It is to be noted in this connection that minor changes in the construction and arrangement of parts may be made without departing from the principle of operation of the various parts.

The invention is clearly illustrated in the accompanying drawings, in which:—

Figure 1 is a side elevation of the invention.

Fig. 2 is a top plan view of the invention.

Fig. 5 is a cross sectional detail of the invention.

Fig. 6 is a bottom plan view of the invention showing the sections connected to operate between two adjacent rows of plants.

Figs. 7, 8 and 9 are detail views.

Similar characters of reference are employed in all of the above described views, to indicate corresponding parts.

Figure 3:
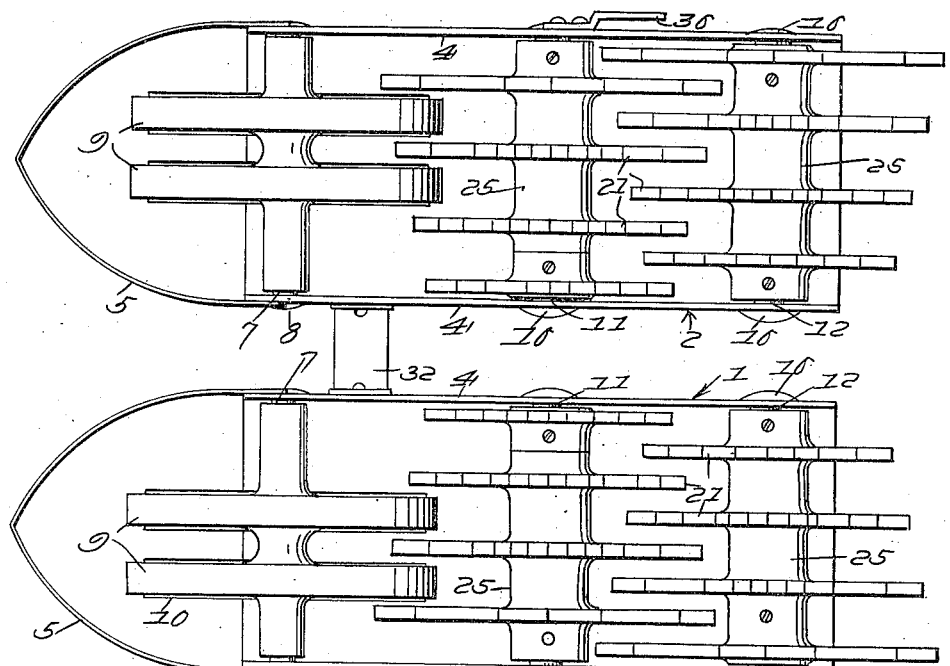
Fig. 3 is a bottom plan view of the device.
Figure 4:
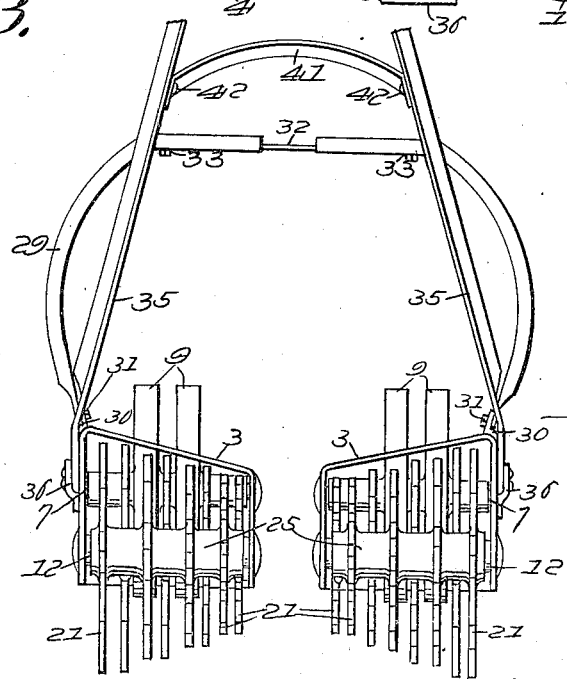
Fig. 4 is an end elevation of the invention.

Referrring now, more particularly, to the accompanying drawings there is provided a pair of sections indicated generally by the numerals 1 and 2 each of which consists of a substantially rectangular housing formed from a piece of sheet metal which is bent into a substantial U-shaped configuration in cross section to form a top 3 and spaced side walls 4 while connected to the forward ends of each housing is a slightly rounded and tapering guard 5. The side walls are provided near their forward extremities with opposed vertical slots 6 while disposed transversely within the housing is a shaft 7, the respective ends of which are engaged by screws 8, the heads of which point against the outer surfaces of the side walls for the clamping of the shaft in various positions of adjustment. Of course, by loosening the screws, the shanks thereof will operate in the slot 6 for the desired adjustment of the shaft. Gage wheels 9 are journaled on the shaft and operate through opposed and longitudinal alining slots 10 in the upper portions of the guards 5 and the tops 3 of the housings as indicated. For the purpose of cultivating the soil, a pair of shafts 11 and 12 are disposed transversely in each housing, the respective ends thereof being formed with an inwardly extending socket in which are engaged the shanks 13, of clamping screws 14 the shanks being also passed through opposed openings 15 in the side walls 4 while the heads 16 of the screws clamp against the outer surfaces of the side walls, each of the shafts 11 and 12 are formed on their respective ends with studs 17 which fit in depressions 18 in the walls and are held in place upon the clamping of the screws 14 so as to prevent rotary movement of the shafts. A tubular shaft 19 is disposed about each of the shafts 11 and 12 and is formed with a longitudinally extending rib 20 for a purpose that will hereinafter appear. Rigidly mounted on the shafts 19 and arranged in suitable spaced relation with respect to each other are the improved cultivating disks indicated in their entireties by the numeral 21. In the present instance each disk consists of a disk like body 22 formed at its periphery with a series of ground engaging teeth 23 and also formed centrally with an opening 24. A hub 25 is joined with the disk like body 22 and is formed with a slot 26 which alines with a notch 27 in the disk-like body. In this connection it is to be observed that the disks are of various diameters and in attaching the disks the same are slid on the shafts 19 so that the alining slots 26 and notches 27 in the disks engage the ribs 20 on the tubular shafts 19, the ribs serving to prevent independent rotary movement of the disks on the shafts. The largest disk is arranged near one side wall while the smallest disk is arranged near the opposite side wall, while intermediate disks have their diameters successively restricted from the largest diametered disk to the smallest diametered disk. Moreover it is to be noted upon reference to Fig. 3 that the hub portions of the outermost disks are of various widths so as to assure of the position of the rows of disks on the two tubular shafts in alternate relation with respect to each other. When in use the teeth of these disks will move the soil upwardly so that it will not be thrown on the plants and as the teeth on the outer edges of the disks pass between the teeth on the adjacent disks the teeth will coöperate with each other in automatically removing any trash or clods of earth from the disks, as is apparent. To further insure of the disks being held stationary with respect to the tubular shafts set screws 28 are mounted through the hub portions of the outer disks and frictionally engage the shafts.

In order to connect the sections in spaced relation with each other so that they may operate on opposite sides of a row of plants a sectional arch or yoke is provided and consists of opposed arcuate sections 29 formed desirably of channel iron, the inner ends being connected to brackets 30 carried by the outer side walls of the housing of each section, through the instrumentality of nut and bolt arrangements 31, while an adjustable connecting section 32 is employed and has its respective ends adjustably connected to the outer portions of the angular sections through the instrumentality of nut and bolt arrangements 33 designed for engagement with any one of the openings 34 in the sections 29, as indicated. Handle bars 35 have their inner ends detachably mounted in sockets 36 in turn mounted on the outer surfaces of the side walls 3 of the housings, the bars being held in position by suitable fasteners, such as set screws 37 while the handle bars each have connected to them an elongated bolt 38, the projecting portions of which carry grips 39, the latter being held against the outer side faces of the bars by means of nuts 40 mounted on the threaded extremities of the bolts and designed to coöperate with the heads of the bolts as is apparent. The bars are also rigidly connected with respect to each other by means of a transverse brace 41, the respective ends of which are secured to the side bars by means of detachable fasteners 42, so that the brace 41 may be connected to the handle bars at different points by means of the holes 42ª, as the sections 1 and 2 are moved toward or away from each other by the adjustment of the connecting section 32. When the sections are connected to each other in the manner described, the smallest diametered disks in each section are positioned near the inner side walls while the disks on the two shafts successively increase in diameter from the smallest diametered disks at the inner side walls of the largest diametered disks near the outer side walls. By this peculiar arrangement when the device is in use and the sections are straddled about a row of plants the lower portions of the disks which are positioned beneath the plates of the lower edges of the side walls dig up the soil in such a manner as to form ridges, the inclined portions of which are positioned on the opposite sides of the rows of plants, the arrangement being clearly indicated in Fig. 5.

In Fig. 6 the sections are connected so that they will operate between 2 adjacent rows and instead of employing the arch, bolts 43 are extended through the side walls and also have mounted thereon spacing washers 44 positioned between the side walls and clamped against the side walls by means of nuts 45 engageable with the projecting ends of the bolts. In this connection it is to be noted that the largest diametered disks are positioned in close relation with each other while the smallest diametered disks are positioned near the outermost side walls.

In use, the device is designed to be either straddled about a row of plants or positioned between adjacent rows of plants, while the handle is used to facilitate pushing of the device forwardly. The gage wheels 8 of course are adjusted so as to regulate the depth of the cultivating disks. The cultivating disks on each of the tubular shafts rotate together, while the disks on one shaft interdigitate with respect to the disks on the other shaft and owing to this peculiar arrangement clods of soil are removed from the teeth on the cultivating disks.

The peculiar advantages incident to the use of this device are that it may be run over the rows and hills of plants which are not yet through the surface without injuring the young plants and it will not only remove all the weeds but will stimulate the growth of the plants even before they reach the surface because the surface will be aerated and warm. Owing to the peculiar construction and arrangement of the cultivating disks the soil which is dug up falls directly behind the teeth and does not fall upon the young plants.

It is thought in view of the foregoing description that further detailed description of the operation of the invention is entirely unnecessary. Likewise it is believed that the advantages of the invention will be readily apparent.

As many changes could be made in the above construction and many apparently widely different embodiments of this invention could be made without departing from the scope thereof it is intended that all matter contained in the above description or shown in the accompanying drawings shall be interpreted as illustrative and not in a limited sense. It is also to be understood that the language used in the following claims is intended to cover all the generic and specific features of the invention herein described and all statements of the scope of the invention which as a matter of language might be said to fall therebetween.

What is claimed is:

1. A device of the character described including a pair of sections each embodying a housing, gage wheels rotatably and adjustably mounted in the forward ends of the housings, rows of interdigitating disks rotatably mounted in the housings, a sectional arch for adjustably connecting the housings together, and handle bars connected to the housings for facilitating the forward movement of the device.

2. A device of the character described including a pair of sections, each consisting of a housing, gage wheels operably mounted in each housing, rows of interdigitating cultivating disks rotatably mounted in each housing, the disks successively increasing in diameter from one side of the housing to the other, means for adjustably connecting the housings of the sections together, and handle bars connected to the sections.

3. In a device of the character described, a pair of sections each embodying a housing, the side walls of which are provided near the forward extremities with opposed vertical slots, a shaft positioned transversely within the housing, gage wheels journaled on the shaft, clamping screws operating in the slots and adjustably engaged in the ends of the shafts and designed for clamping against the outer surfaces of the housings for maintaining the shafts and consequently the gage wheels in various positions of adjustment, cultivating disks rotatably mounted in the housings, and means for adjustably connecting the housings of each section together.

4. A device of the character described including a pair of sections each embodying a housing, gage wheels rotatably and adjustably mounted in the housings, shafts rigidly connected transversely of the housings, tubular shafts journaled on the stationary shafts, a series of cultivating disks rigidly connected on each tubular shaft and arranged in interdigitating relation with the disks on the adjacent shaft, the disks varying in diameter from one end of the shaft to the other end of the shaft, and means for adjustably connecting the housings of each section together.

5. A device of the character described including a pair of sections each consisting of a housing, cultivating disks rotatably mounted therein and arranged in interdigitating relation with respect to each other, means for regulating the depth of the disks when the device is in use, and means for adjustably connecting the sections laterally of each other.

6. A device of the character described consisting of a pair of sections each embodying a housing, gage wheels rotatably and adjustably mounted in the forward ends of the housings, guards connected to the forward extremities of the housings, stationary shafts connected transversely of the housings, tubular shafts on the stationary shafts each tubular shaft being formed with a rear cultivator disk including a body having a central opening therein, a plurality of teeth formed at the periphery of the disk, a hub portion integral with each disk about the opening therein and formed with a slot for slidable disposition on the ribbed tubular shafts, the ribs on the shafts preventing independent rotatable movement of the disks, means for adjustably connecting the housings of each section together, and handle bars detachably connected to the sections for facilitating movement of the device.

7. A device of the character described, comprising a pair of sections each embodying a housing, a shaft positioned transversely within each housing, gage wheels journaled upon each shaft, the housings being formed with slots adjacent to which the ends of the shafts lie, clamping screws passing through the slots and engaging the shafts and having their heads bearing against the housing to adjustably support the shaft and thereby vary in a vertical direction the gage wheels, cultivating disks rotatably mounted in the housings, and means for adjusting the housings toward and away from each other for the useful purpose specified.

In testimony whereof I affix my signature.

BENJAMIN W. LESH.

Copies of this patent may be obtained for five cents each, by addressing the "Commissioner of Patents, Washington, D. C."